(12) United States Patent
Weder et al.

(10) Patent No.: US 6,349,462 B1
(45) Date of Patent: *Feb. 26, 2002

(54) METHOD FOR PROVIDING A FLOWER POT COVER WITH CRIMPED PORTION

(75) Inventors: Donald E. Weder; Joseph G. Straeter, both of Highland; William F. Straeter, Breese, all of IL (US)

(73) Assignee: Southpac Trust International, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 09/607,469

(22) Filed: Jun. 29, 2000

Related U.S. Application Data

(63) Continuation of application No. 09/165,579, filed on Oct. 2, 1998, now Pat. No. 6,148,497, which is a continuation of application No. 08/933,365, filed on Sep. 19, 1997, now Pat. No. 5,816,022, which is a continuation of application No. 08/673,943, filed on Jul. 1, 1996, now Pat. No. 5,715,650, which is a continuation-in-part of application No. 08/463,905, filed on Jun. 5, 1995, now Pat. No. 5,718,081, which is a continuation of application No. 08/306,558, filed on Sep. 15, 1994, now Pat. No. 5,509,188, which is a continuation of application No. 08/940,930, filed on Sep. 4, 1992, now Pat. No. 5,361,482.

(51) Int. Cl.[7] ............................................. B21D 35/00
(52) U.S. Cl. ......................... 29/469.5; 29/505; 53/397; 47/72
(58) Field of Search ................................. 29/469.5, 505, 29/525.1; 53/558, 559, 563, 397

(56) References Cited

U.S. PATENT DOCUMENTS

| 732,889 A | 7/1903 | Paver |
| 1,446,563 A | 2/1923 | Hughes |
| 2,150,453 A | 3/1939 | Mulford et al. |
| 2,302,259 A | 11/1942 | Rothfuss ........................ 41/10 |

(List continued on next page.)

FOREIGN PATENT DOCUMENTS

| DE | 345464 | 2/1917 |
| DE | 8905250 | 10/1989 |
| FR | 1376047 | 9/1964 |
| FR | 1393725 | 2/1965 |
| FR | 2137325 | 12/1972 |
| FR | 2467796 | 4/1981 |
| FR | 2619698 | 3/1989 |
| GB | 1096058 | 12/1967 |

OTHER PUBLICATIONS

Ex. A—Color Them Happy With Highlander® Products, ©1992, 2 pages.
Ex. A—Super Seller, Supermarket Floral, Sep. 15, 1992.
Ex. C—Costa Keeps the Christmas Spirit, Supermarket Floral, Sep. 15, 1992.
Ex. D—Now, More Than Ever, Supermarket Floral, Sep. 15, 1992.
Ex. E—Halloween, Link Magazine, Sep. 1992, 2 pages.
Ex. F—Speed Cover® Brochure—The Simple Solution . . . , ©1989.
Ex. G.—Speed Sheets and Speed Rolls Brochure, ©1990.

Primary Examiner—S. Thomas Hughes
Assistant Examiner—Steve Blount
(74) Attorney, Agent, or Firm—Dunlap, Codding & Rogers, P.C.

(57) ABSTRACT

A flower pot cover having a base and preferably a skirt. The base has an upper end, a lower end and a pot receiving space. The skirt is connected to the upper end of the base and the skirt extends a distance outwardly from the base. A bonding material is disposed on the skirt. A flower pot is disposed in the pot receiving space and the portion of the skirt having the bonding material thereon is crimped to provide a bonded crimped portion in the skirt. The crimped portion may be formed after the pot is disposed within the cover.

11 Claims, 4 Drawing Sheets

U.S. PATENT DOCUMENTS

| | | | |
|---|---|---|---|
| 2,621,142 A | 12/1952 | Wetherell | 154/117 |
| 2,648,487 A | 8/1953 | Linda | 229/55 |
| 2,822,287 A | 2/1958 | Avery | |
| 2,846,060 A | 8/1958 | Yount | |
| 2,850,842 A | 9/1958 | Eubank, Jr. | |
| 2,883,262 A | 4/1959 | Borin | |
| 3,178,086 A | 4/1965 | Palmer | |
| 3,376,666 A | 4/1968 | Leonard | 47/41 |
| 3,557,516 A | 1/1971 | Brandt | 53/14 |
| 3,962,503 A * | 6/1976 | Crawford | |
| 4,118,890 A | 10/1978 | Shore | |
| 4,216,620 A | 8/1980 | Weder et al. | |
| 4,280,314 A | 7/1981 | Stuck | |
| 4,333,267 A | 6/1982 | Witte | |
| 4,418,497 A | 12/1983 | Mastriano | |
| 4,621,733 A | 11/1986 | Harris | |
| 4,640,079 A | 2/1987 | Stuck | |
| 4,733,521 A | 3/1988 | Weder et al. | 53/580 |
| 4,771,573 A * | 9/1988 | Stengel | |
| 4,773,182 A * | 9/1988 | Weder et al. | |
| 4,801,014 A | 1/1989 | Meadows | 206/423 |
| 4,950,216 A | 8/1990 | Weder | 47/41.01 X |
| 4,980,209 A | 12/1990 | Hill | 428/34.1 |
| D314,732 S | 2/1991 | Weder | D11/143 X |
| 5,029,412 A | 7/1991 | Weder et al. | 47/72 |
| 5,111,638 A | 5/1992 | Weder | 53/397 |
| 5,181,364 A | 1/1993 | Weder | 53/397 |
| 5,307,606 A | 5/1994 | Weder et al. | 53/452 X |
| 5,361,482 A | 11/1994 | Weder et al. | 29/469.5 |
| 5,381,642 A | 1/1995 | Weder et al. | 47/72 X |
| 5,410,856 A | 5/1995 | Weder et al. | 53/397 |
| 5,428,939 A | 7/1995 | Weder et al. | 53/397 |
| 5,467,573 A | 11/1995 | Weder et al. | 53/397 |
| D365,305 S | 12/1995 | Weder et al. | D11/143 X |
| D366,009 S | 1/1996 | Weder et al. | D11/143 X |
| D366,631 S | 1/1996 | Weder et al. | D11/152 X |
| 5,479,758 A | 1/1996 | Weder | 53/456 X |
| 5,493,809 A | 2/1996 | Weder et al. | 47/72 |
| 5,509,188 A | 4/1996 | Weder et al. | 53/397 X |
| 5,542,169 A | 8/1996 | Weder et al. | 29/469.5 |
| 5,566,439 A | 10/1996 | Weder | 29/469.5 |
| 5,595,022 A | 1/1997 | Weder | 47/72 |
| 5,595,048 A | 1/1997 | Weder et al. | 53/399 |
| 5,625,937 A | 5/1997 | Weder | 53/397 |

* cited by examiner

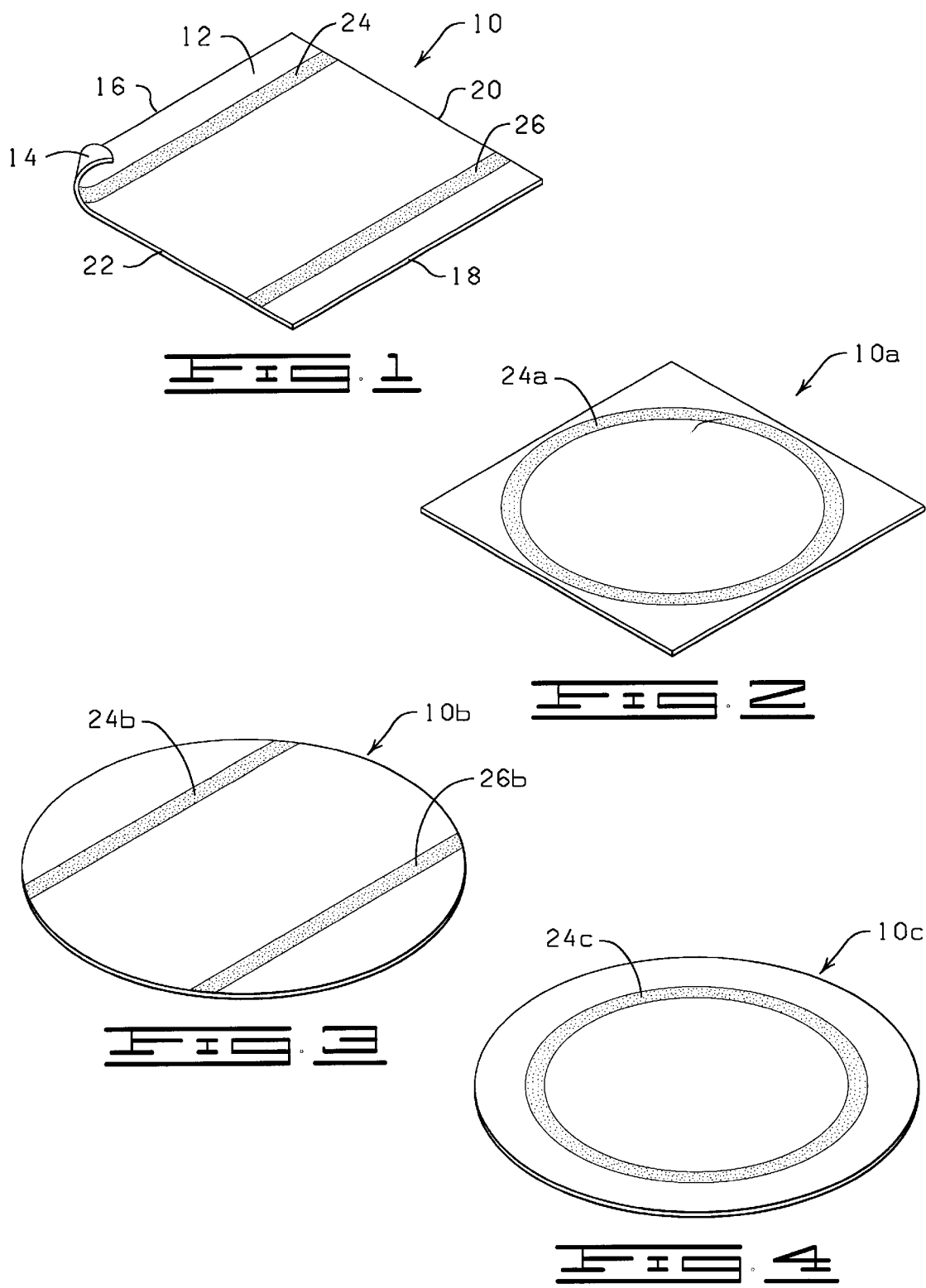

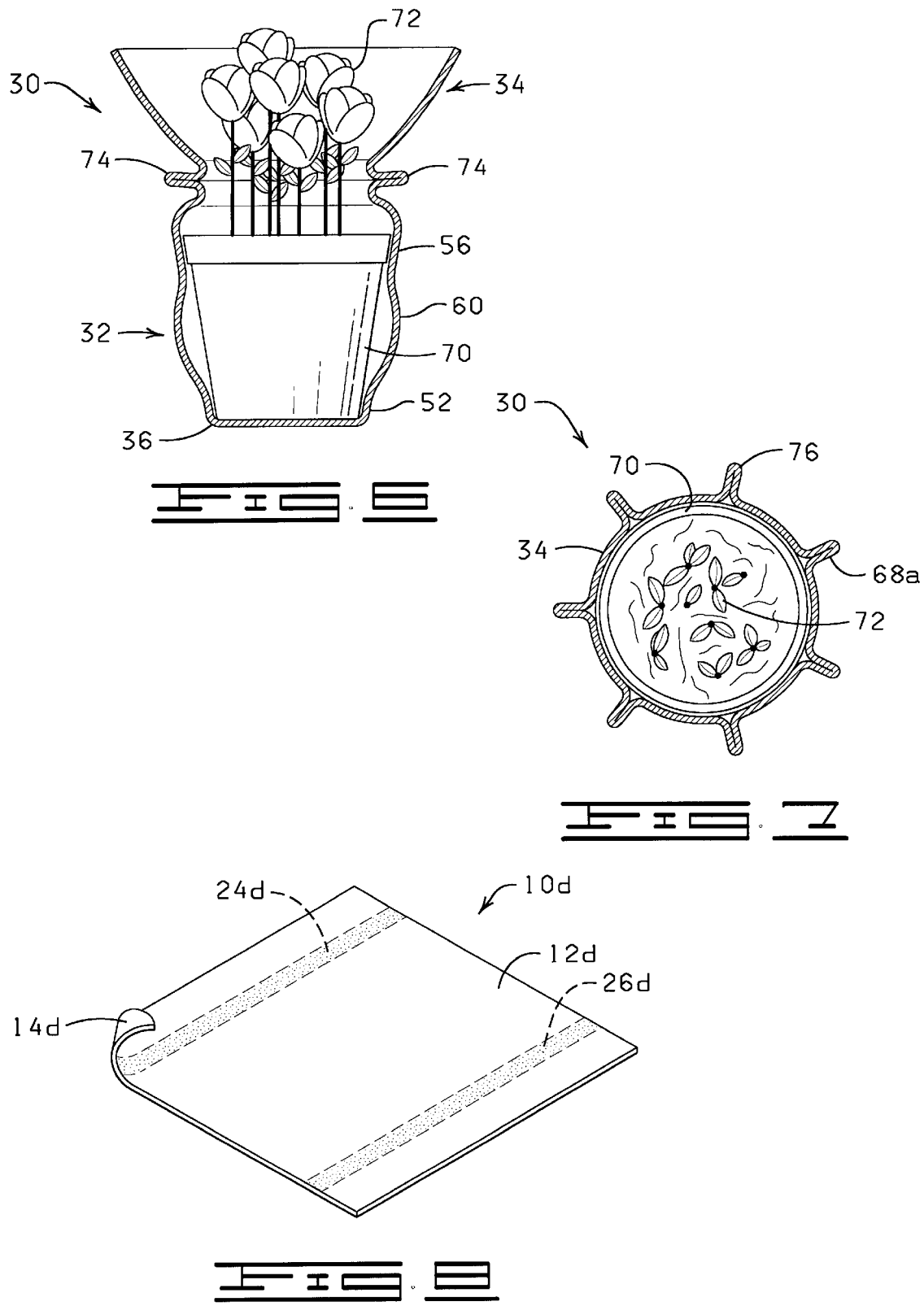

METHOD FOR PROVIDING A FLOWER POT COVER WITH CRIMPED PORTION

RELATED REFERENCES

This application is a continuation of U.S. Ser. No. 09/165,579, filed on Oct. 2, 1998, now U.S. Pat. No. 6,148,497; which is a continuation of U.S. Ser. No. 08/933,365, filed on Sep. 19, 1997, now U.S. Pat. No. 5,816,022; which is a continuation of U.S. Ser. No. 08/673,943, filed Jul. 1, 1996, now U.S. Pat. No. 5,715,650; which is a continuation-in-part of U.S. Ser. No. 08/463,905, filed Jun. 5, 1995, now U.S. Pat. No. 5,718,081; which is a continuation of U.S. Ser. No. 08/306,558, filed Sep. 15, 1994; now U.S. Pat. No. 5,509,188; which is a continuation of U.S. Ser. No. 08/940,930, filed Sep. 4, 1992; now U.S. Pat. No. 5,361,482.

FIELD OF INVENTION

The present invention relates generally to flower pot covers for providing decorative coverings for flower pots and, more particularly, but not by way of limitation, to a flower pot cover having a bonding material thereon where the skirt portion of the flower pot cover having the bonding material thereon is crimped to provide a crimped portion in the cover.

DESCRIPTION OF THE DRAWINGS

FIG. 1 is a perspective view of a sheet of material used in accordance with the present invention.

FIG. 2 is a perspective view of another sheet of material which may be used in the present invention.

FIG. 3 is a perspective view of yet another sheet of material.

FIG. 4 is a perspective view of still another sheet of material used herein which is constructed in accordance with the present invention.

FIG. 6 is a cross-sectional view showing the flower pot cover of FIG. 5A disposed over a flower pot with a lateral crimped portion being formed in the flower pot cover.

FIG. 7 is a cross-sectional view of the pot cover of FIG. 5A having a vertical crimped portion formed in the pot cover.

FIG. 8 is a perspective view of a sheet of material having a bonding material on the downwardly facing (outside) side of the sheet.

DESCRIPTION OF THE PREFERRED EMBODIMENTS

Figures 5A, 5B:
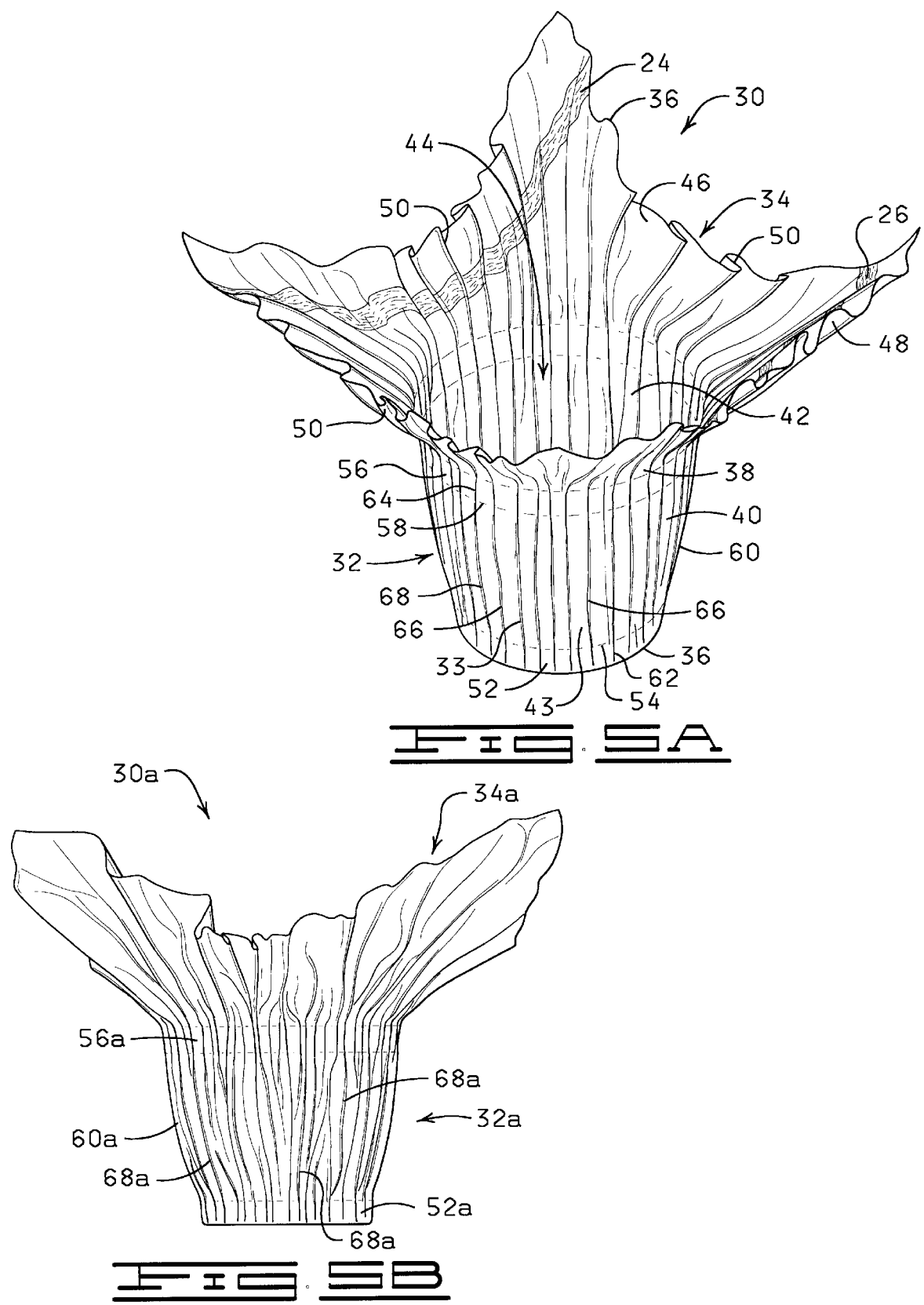
FIG. 5A is a perspective view showing a preformed flower pot cover made in accordance with the present invention.
FIG. 5B is a perspective view of the cover of FIG. 5A.

Shown in FIG. 1 and designated therein by the general reference numeral 10 is a sheet of material used to form a flower pot cover constructed in accordance with the present invention.

The sheet of material 10 has a first surface 12, a second surface 14, a first side 16, a second side 18 opposite the first side 16, a third side 20, and a fourth side 22 opposite the third side 20. Disposed upon the first surface 12 is a first strip 24 of bonding material, extending from near the third side 20 to the fourth side 22, and a second strip 26 of bonding material also extending from near the third side 20 to the fourth side 22. The first strip 24 and a second strip 26 are shown as continous from third side 20 to fourth side 22, but it will be understood by one of ordinary skill in the art that the bonding material of first and second strips 24 and 26 may be interrupted or discontinous over their lengths. The first and second strips 24 and 26 may be disposed in different patterns and orientations. For example, shown in FIG. 2 is a sheet of material 10a having a first strip 24a of bonding material having a circular pattern. It will also be understood that the sheet of material itself may have a shape other than square or rectangular. For example, the sheet of material may have a circular shape such as shown in FIGS. 3 and 4. In FIG. 3, a circular sheet of material 10b is shown as having a first strip 24b of bonding material and a second strip 26b of bonding material. FIG. 4 shows a similarly shaped sheet of material 10c but with a first strip 24c of bonding material disposed in a circular pattern. The sheet of material used herein may have any other geometric shape, e.g., trapezoidal, stars, pentagonal, hexagonal, octagonal, or heart-shape, as long as the sheet of material is able to function in accordance with the invention described herein. The bonding material also coild be applied to the sheet of material in the form of spaced apart spots of in any other geometric form and in any pattern including covering the entire first surface 12 or second surface 14 (or both surfaces 12 and 14) of the sheet of material 10. The term "spot" or "spots" includes any geometric shape of spot including, but not limited to, what is commonly referred to as stripe.

In one preferred version of the invention, the sheet of material 10 is used to form a preformed pot cover 30 (shown in FIG. 5A) by taking the sheet of material 10 and placing it between a male and a female mold (not shown). The male mold is brought into mating engagement with the female mold thereby forming the pot cover 30 (also referred to herein as cover 30) having a base 32 and a skirt 34. In this process, a plurality of overlapping folds are formed in the base 32. The overlapping folds cooperate to maintain the structural integrity of the base 32 and cooperate to maintain the base 32 in the preformed shape. Apparatus and methods for forming a pot cover, as just described are disclosed in detail in U.S. Pat. No. 4,773,182, titled "Article Forming System", issued Sep. 27, 1988, and in U.S. Pat. No. 5,029,412, issued Jul. 9, 1991, titled "Flower Pot Or Flower Pot Cover With Pleated Skirt And Or Base", the disclosures of which are hereby specifically incorporated herein by reference.

The cover 30 has a base 32 and a skirt 34 which has an outer edge 36. The base 32 has a lower end 36, an upper end 38, an outer surface 40 and an inner surface 42 encompassing a pot receiving space 44.

In a preferred manner, the skirt 34 is formed integrally with the base 32. The skirt 34 is connected to the upper end 38 of the base 32. The skirt 34 has an inner surface 46 and an outer surface 48. In one form, shown in FIG. 5A, a plurality of folds 50 also are formed in the skirt 34.

In one preferred version of the invention, the base 32 comprises a lower portion 52 extending from the lower end 36 to a line 54 positioned above the lower end 36, an upper portion 56 extending from the upper end 38 to a line 58 positioned below the upper end 38, and a medial portion 60 extending about from line 54 to line 58. The lower portion 52 comprises a portion of the base 32 which has a plurality of connected overlapping folds such as fold 62. The upper portion 56 also comprises a portion of the base 32 which has a plurality of connected overlapping folds such as fold 64. The medial portion 60, disposed between the upper portion 56 and the lower portion 52, comprises a portion of the base 32 having folds 66 which are unconnected, the medial portion 60 of the base 32 thereby left substantially unbonded, thus resulting in a portion of the base 32 having a more billowy appearance in comparison to the flatter appearance of the bonded upper and lower portions 56 and 52. In an alternative version of the invention, the entire base may substantially comprise connected overlapping folds (not shown) or may substantially comprise folds which are unconnected.

The base 32 of cover 30 is shown in FIG. 5A as comprising folds 68 which are substantially vertically oriented along their entire length. Shown in FIG. 5B is an alternative version of the cover, designated by the reference numeral 30a having a base 32a, a skirt 34a, a lower portion 52a, an upper portion 56a, and a medial portion 60a. The cover 30a is basically identical to cover 30 except the folds 68a are more or less randomly oriented directionally rather than uniformly vertically oriented.

In accordance with the method of the present invention, a pot such as the one designated in FIG. 6 by reference numeral 70 is disposed within the pot receiving space 44 (not shown). Typically, the pot 70 contains a plant or floral grouping 72 which extends a distance above the upper end of the pot 70. The pot 70 is substanitally surrounded by the base 32 of the cover 30. After the pot 70 has been disposed within the base 32, the skirt 34 is crimped about the floral grouping 72. The crimped portion, shown in the FIG. 6, is designated by the reference numeral 74 and is formed in the skirt 34 of cover 30 by pinching together portions of the skirt 34 in the vicinity of the first and second strips 24 and 26 of bonding material so that the overlapping portions of the skiry 34 are bondingly connected together in a position above the upper end of the pot 70 and around the floral grouping 72, thereby assisting in securing the cover 30 in a position about the pot 70 and floral grouping 72. In FIG. 6, the crimped portion 74 is positioned laterally about the skirt 34, and extends outwardly away from the floral grouping 72. The crimped portion 74 may extend continuously laterally about the skirt 34, or may be discontinuous. Alternatively, a crimped portion may be formed so that the overlapped portions are vertically oriented, such as the crimped portion 76 shown in the cover 30 in FIG. 7.

The crimping step may be conducted before the pot 70 is disposed within the cover 30, or the crimping step may be conducted after the pot 70 is disposed within the cover 30 by crimping the skirt 34 in the area of the first and second strips 24 or 26 of bonding material. Such crimping may be conducted by hand, by grasping portions of the skirt 34 having the bonding material thereon, in the area of the first and second strips 24 and 26 of bonding material, and squeezing those portions together about the area of the first and second strips 24 or 26 bonding material, thereby pressing and gathering the sheet of material 10 into bonding engagement therewith. The skirt 34 may also be crimped by using both a crimping motion and a turning motion to create a twisted crimped portion (not shown), resulting in a cover which is both crimped, as described previously, and which is twisted about a lower portion of the floral grouping 72 within the pot 70 near the stem end (not shown) being rotated between about one-eighth of a turn to about a full turn primarily in the area near the stem end (not shown) of the floral grouping 72. Such crimping as described above may also be conducted by any instrument or machine used for gathering or crimping materials.

Figure 9:
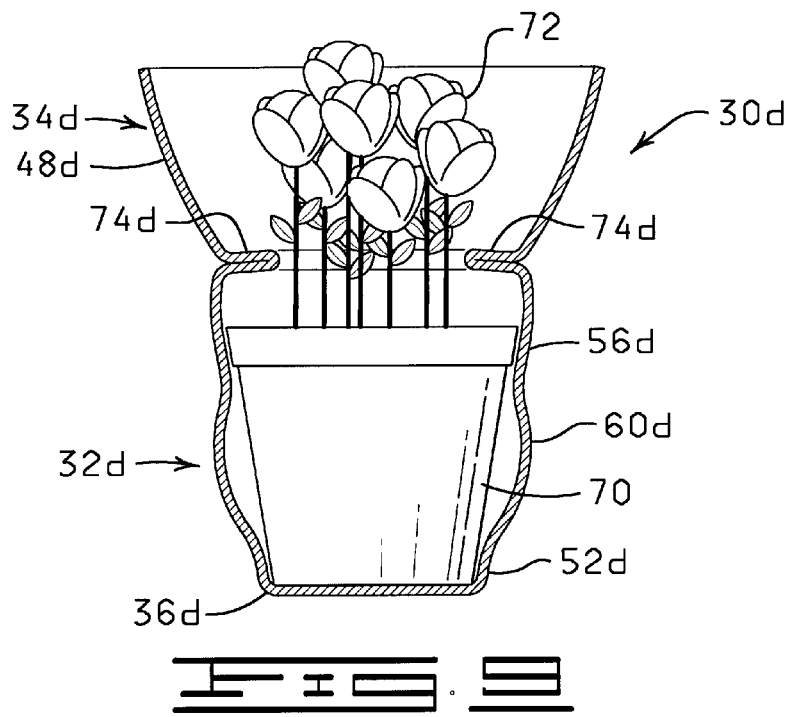
FIG. 9 is a cross-sectional view of a pot cover formed from the sheet of FIG. 8 with a lateral crimped portion formed therein.
Figure 10:
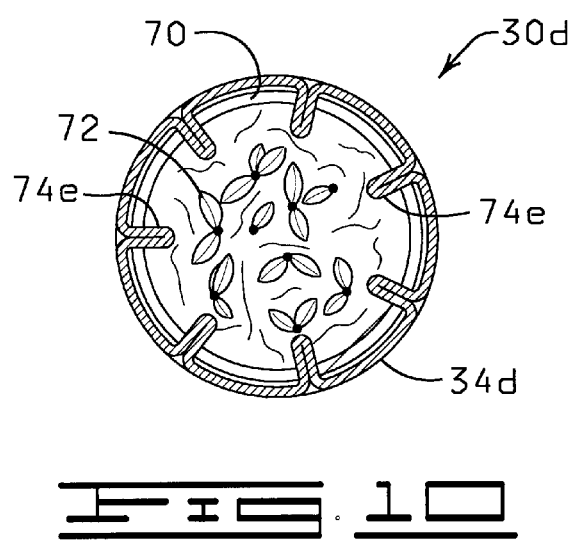
FIG. 10 is a cross-sectional view of the pot cover of FIG. 9 but instead having a vertical crimped portion.

In an alternative version of the invention, a cover is formed from a sheet of material 10d, such as shown in FIG. 8, having a first surface 12d and a second surface 14d and which has a first strip 24d of bonding material and a second strip 26d of bonding material, both of which are disposed on the second surface 14d of the sheet 10d. When a cover 30d is formed from a sheet such as the sheet of material 10d, the bonding material is positioned on an outer surface 48d of the skirt 34d of the cover 30d. Shown in FIG. 9 is a cover formed in such a way. The cover 30d comprises a base 32d, a skirt 34d, a lower portion 52d in the base 32d, an upper portion 56d in the base 32d and a medial portion 60d. Since the bonding material is positioned on the outer surface 48d of the cover 30d, a crimped portion 74d which is formed is oriented in an inward direction toward the floral grouping 72 and extends laterally about the floral grouping 72. In an alternative method of forming the crimped portion in the cover 30d, portions of the skirt 34d may be crimped so that they are oriented in an upwardly oriented direction, such as crimped portions 74e shown in FIG. 10. The crimped portions 74d of the cover 30d in FIG. 9 may extend continuously about the skirt 34d or may be discontinuous.

The first and second strips 24 and 26 of bonding material may be applied to the sheet of material 10 prior to forming the sheet of material 10 into the cover 30 or the first and second strips 24 and 26 of bonding material may be applied during the forming of the sheet of material 10 into the cover 30 or the first and second strips 24 and 26 of bonding material may be applied after the cover 30 has been formed.

In another version of the invention, any of the pot covers described herein may further include a bonding material (not shown) disposed on a portion of the inner surface 42 of the base 32 for bonding the base 32 of the cover 30 (or other covers described herein) to the outer surface of the pot 70.

In other instances, the bonding material on the inner surface of the base 32 may be a cohesive. In such a case, a cohesive material also is included on the outer peripheral surface of the flower pot 70 for bondingly engaging with the cohesive bonding material on the flower pot cover 30.

Preferably, the sheet of material 10 used in accordance with the present invention is constructed from a material selected from the group of materials consisting of paper (treated or untreated), foil, polymer film, fabric (natural or synthetic, woven or nonwoven), or burlap or combinations or laminations thereof.

The term "polymer film" means a man-made polymer such as a polypropylene or a naturally occurring polymer such as cellophane. A polymer film is relatively strong and not as subject to tearing (substantially non-tearable), as might be the case with paper or foil.

The sheet of material 10–10d or other embodiments described herein may vary in color. Further, the sheet of material 10–10d may consist of designs or decorative patterns which are printed, etched, and/or embossed thereon using inks or other printing materials. An example of an ink which may be applied to the surface of the sheets of material described herein is described in U.S. Pat. No. 5,147,706, entitled "Water Based Ink On Foil And/Or Synthetic Organic Polymer" issued to Kingman on Sep. 15, 1992 and which is hereby incorporated herein by reference. In addition, the sheets of material 10–10 described herein may have various colorings, coatings, flocking and/or metallic finishes, or other decorative surface ornamentation applied separately or simultaneously or may be characterized totally or partially by pearlescent, translucent, transparent, iridescent or the like, qualities. Each of the above-named characteristics may occur alone or in combination and may be applied to the upper and/or lower surface of the sheets of material 10–10d described herein. Moreover, each surface of the sheets of material described herein may vary in the combination of such characteristics. The sheets of material 10–10d described herein may be opaque, translucent or partially clear or tinted transparent.

The material has a thickness in a range from about 0.1 mil to about 30 mils. Preferably, the material has a thickness in a range from about 0.1 mil to about 5 mils.

The sheets of material 10–10d described herein may be constructed of a single layer of material or a plurality of layers of the same different types of materials. Any thickness of the sheet of material 10–10d may be utilized in accordance with the present invention as long as the sheet of material 10–10d is formable into a preformed pot cover with a skirt, as described herein. The layers of material comprising the sheet of material 10–10d may be connected together or laminated or may be separate layers, and the layers of material comprising the sheet of material 10–10d need not be uniform in shape or composition.

As noted above, the sheet of material 10–10d may be constructed of a single layer of material or a plurality of layers of the same or different types of materials. Any thickness of the sheet of material 10–10d may be utilized in accordance with the present invention as long as the sheet of material 10–10d may be formed into a flower pot cover, as described herein. Additionally, an insulating material such as bubble film, preferable as one of two or more layers, can be utilized in order to provide additional protection for the item wrapped therein.

In a preferred embodiment, the sheet of material 10–10d is constructed from two polypropylene films (a 20"×15" sheet of Mobil 270 ABW white opaque film laminated to a 20"×15" sheet of Mobil 220 AB clear film) having a thickness in a range of from less than about 1.0 mil to about 2.5 mils. The layers of material comprising the sheet of material 10–10d may be connected together or laminated or may be separate layers.

A decorative pattern, such as a color and/or an embossed pattern, and/or other decorative surface ornamentation may be applied to the inner peripheral surface and/or the outer peripheral surface of the sheet of material 10–10d or cover or portions thereof including, but not limited to printed design, coatings, colors, flocking or metallic finishes. The sheet of material 10–10d also may be totally or partially clear or tinted transparent material.

The term "bonding material" when used herein means an adhesive, preferably a pressure sensitive adhesive, or a cohesive. Where the bonding material is a cohesive, a similar cohesive material must be placed on the adjacent surface for bondingly contacting and bondingly engaging with the cohesive material. The term "bonding material" also includes material which are heat sealable and, in this instance, the adjacent portions of the material must be brought into contact and then heat must be applied to effect the seal. The term "bonding material" also includes materials which are sonic sealable and vibratory sealable. The term "bonding material" when used herein also means a heat sealing lacquer which may be applied to the sheet of material and, in this instance, heat, sound waves, or vibrations, also must be applied to effect the sealing.

The bonding material on the skirt may be selected from the group consisting of a pressure sensitive adhesive or cohesive, a heat sensitive adhesive or cohesive, a sonically sealable adhesive or cohesive, a vibratingly sealing adhesive or cohesive, or a chemically sealing adhesive or cohesive.

The sheet of material 10–10d used herein may further comprise at least one scent (not indicated in the figures). Examples of scents utilized herein include (but are not limited to) floral scents (flower blossoms, or any portion of a plant), food scents (chocolate, sugar, fruits), or herb or spice scents (cinnamon), and the like. Additional examples of scents include flowers (such as roses, daisies, lilacs), plants (such as fruits, vegetables, grasses, trees), foods (for example, candies, cookies, cake), food condiments (such as honey, sugar, salt), herbs, spices, woods, roots, and the like, or any combination of the foregoing. Such scents are known in the art, and are commercially available.

The scent may be disposed upon the sheet of material 10 by spraying the scent thereupon, painting the scent thereupon, brushing the scent thereupon, lacquering the scent thereupon, immersing the sheet of material 10–10d in a scent-containing liquid, exposing the sheet of material 10–10d to scent-containing gas, or any combination thereof.

The scent may be contained within a lacquer, or other liquid, before it is disposed upon the sheet of material 10–10d. The scent may also be contained within a dye, ink, and/or pigment (not shown). Such dyes, inks and pigments are known in the art, and are commercially available, and may be disposed upon or incorporated in the sheet of material 10–10d by any method described herein or known in the art.

The term plant or "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping.

The term "propagule" when used herein means any structure capable of being propagated or acting as an agent of reproduction including seeds, shoots, stems, runners, tubers, plants, leaves, roots or spores.

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "floral grouping" where used herein, means cut fresh flowers, artificial flowers, a single flower, other fresh and/or artificial plants or other floral materials and may include other secondary plants and/or ornamentation or artificial or natural materials which add to the aesthetics of the overall floral arrangement. The floral grouping comprises a bloom or foliage portion and a stem portion. However, it will be appreciated that the floral grouping may consist of only a single bloom or only foliage (not shown). The term "floral grouping" may be used interchangeably herein with the term "floral arrangement".

Changes may be made in the construction and the operation of the various components, elements and assemblies described herein or in the steps or the sequence of steps of the methods described herein without departing from the spirit and scope of the invention as defined in the following claims.

What is claimed is:

1. A method for providing a cover for a pot having an upper end, a lower end and an outer peripheral surface, comprising:

providing a preformed Pot cover comprising a base having an upper end and the base having at least some connected overlapping folds, and at least some unconnected overlapping folds, the base further comprising an outer surface and a pot receiving space, and the base having a skirt extending a distance from the upper end of the base, the skirt having an inner surface and an outer surface and having a bonding material disposed upon a portion of at least one of the inner surface and outer surface thereof;

disposing a pot into the pot receiving space of the base; and crimping together portions of the skirt having the bonding material thereon forming a crimped portion in the skirt.

2. The method of claim 1 wherein the step of forming the crimped portion is defined further as forming the crimped portion extending at least partially circumferentially about the preformed pot cover.

3. The method of claim 1 wherein the crimped portion is discontinuous.

4. The method of claim 1 wherein the bonding material is selected from the group consisting of pressure sensitive adhesives or cohesives, heat sensitive adhesives or cohesives, sonically sealable adhesives or cohesives, vibratingly sealable adhesives or cohesives, chemically sealing adhesives or cohesives, or cold sealing adhesives or cohesives.

5. The method of claim 1 wherein in the step of providing a preformed pot cover, the bonding material comprises at least two spaced apart strips on a portion of the inner surface of the skirt.

6. The method of claim 1 wherein in the step of providing a preformed pot cover, the preformed pot cover has a bonding material disposed upon a portion thereof for bonding the base to the pot disposed therein.

7. A method for providing a cover for a pot having an upper end, a lower end and an outer peripheral surface, comprising:

providing a preformed pot cover having an upper end and a lower end and the preformed pot cover having at least some connected overlapping folds and at least some unconnected overlapping folds and the preformed pot cover further comprising an outer surface, an inner surface, and a pot receiving space, and the preformed pot cover having an adhesive or cohesive bonding material disposed upon a portion of at least one of the inner surface and outer surface thereof;

disposing a pot into the pot receiving space of the preformed pot cover; and crimping together portions of the preformed pot cover about the pot forming a crimped portion.

8. The method of claim 7 wherein the crimped portion is discontinuous about the pot.

9. The method of claim 7 wherein the bonding material is selected from the group consisting of pressure sensitive adhesives or cohesives, heat sensitive adhesives or cohesives, sonically sealable adhesives or cohesives, vibratingly sealable adhesives or cohesives, chemically sealing adhesives or cohesives, or cold sealing adhesives or cohesives.

10. The method of claim 7 wherein in the step of providing a preformed pot cover, the bonding material comprises at least two spaced apart strips.

11. The method of claim 7 wherein in the step of providing a preformed pot cover, the preformed pot cover has a bonding material disposed upon a portion thereof for bonding the preformed pot cover to the pot disposed therein.

* * * * *